INVENTOR.
John C. Foster by Sparrow and Sparrow
ATTORNEYS.

*INVENTOR.*
John C. Foster

*by* Sparrow and Sparrow
ATTORNEYS.

*INVENTOR.*
John C. Foster

*by* Sparrow and Sparrow

ATTORNEYS.

United States Patent Office 3,492,427

Patented Jan. 27, 1970

3,492,427

TELEPHONE CALL ANSWERING AND MESSAGE RECORDING AND PLAYBACK DEVICE INCLUDING HANDSET SUPPORT COUPLER

John C. Foster, New York, N.Y., assignor, by mesne assignments, to Nicolas Darvas, Paris, France Filed Oct. 24, 1966, Ser. No. 588,972

Int. Cl. H04m *11/10*

U.S. Cl. 179—6 7 Claims

ABSTRACT OF THE DISCLOSURE

An automatic telephone call answering and message recording device. The device includes recording and playback apparatus for use with conventional telephone instruments. A support member arranged over the cradle of the telephone instrument supports the handset when the device is in operation. A solenoid becomes actuated to release the spring-loaded buttons of the telephone instrument when a call signal is transmitted to the instrument. A pre-recorded outgoing message is transmitted after the call signal, and any incoming message is recorded for subsequent playback.

This invention relates generally to devices that receive, record and play back messages on magnetic tape, and relates more particularly to a device that answers a telephone call in response to the ringing of the telephone bell signal, delivering a pre-recorded outgoing message and receiving and recording incoming messages and playing back these messages.

There are many devices for automatically answering a telephone call by a pre-recorded message and then receiving and recording an incoming message. The basic idea is to make it possible for a conventional telephone instrument, at home or in the office, to receive and record an incoming call or message when no person is present at the time of the call. The convenience of such a device is quite apparent. However, although there are many such devices of this kind, they have not proved entirely practical or efficient, are complicated and expensive, easily get out of order, and some even require installation and connection to the telephone circuit. The present invention is directed to render a telephone automatic, without preventing the normal manual use of the telephone with the device attached.

The invention consists in such novel features, construction arrangements, combinations of parts and improvements as may be shown and described in connection with the apparatus herein disclosed by way of example only and as illustrative of a preferred embodiment. Objects and advantages of the invention will be set forth in part hereafter and in part will be obvious herefrom or may be learned by practicing the invention, the same being realized and attained by means of the instrumentalities and combinations pointed out in the appended claims.

The term "automatic" hereinafter referred to shall mean when the device and telephone are unattended, and the term "manual" shall mean when the subscriber is present and attending to the device or telephone.

It is a general object of the present invention to provide an improved system or device which is practical, simple and efficient for answering a telephone call during time periods when the telephone set is unattended.

A further object of the present invention is to provide novel means by operation of a pushbutton to ready the instrumentalities of the device of the invention for automatic functioning for answering the telephone, delivering a pre-recorded outgoing message, recording the incoming message, and readying the device for the receiving of the next incoming call.

Another object of the present invention is to provide a unitary device which is independent of the telephone circuitry and which does not interfere with the normal operation of the telephone instrument while the device is attached thereto.

A still further object of the present invention is to provide an apparatus which is entirely independent from the conventional telephone and which does not require any alteration of the telephone.

Another object of the present invention is to provide a device having a novel yet very simple electrical system using conventional electrical and electronic components.

Still another object of the present invention is to rectify the AC line current, employing in the device of the invention isolated transistorized DC circuits for the various amplifier stages, but switching the AC current instead of the DC current.

Yet another object of the present invention is to provide a telephone call answering and message receiving and recording and playback device which is self-contained and positioned for operation by mere placement of said device upon the conventional telephone set and being connected only to a source of AC electrical current.

Still another object of the present invention is to provide a device which has manually operable mechanical means (as by the pressing of a button) to free the telephone contact pins from the weight of the telephone hand set, simultaneously electromagnetically operating a mechanical means to hold down these contact pins (independent of the telephone hand set) and release the pins upon the ringing of the telephone bell, while readying the electronic circuit to answer the incoming call, to transmit a pre-recorded outgoing message and to record the incoming call.

Various further and more specific objects, purposes, features and advantages of the invention will clearly appear from the detailed description given below taken in connection with the accompanying drawings which form part of this specification and illustrate merely by way of example one embodiment of the device of the invention.

In the following description and in the claims, parts will be identified by specific names for convenience, but such names are intended to be as generic in their application to similar parts as the art will permit. Like reference characters denote like parts in the several figures of the drawings in which:

FIGS. 5, 6 and 7 form an exploded assembly of the device;

Figure 4:
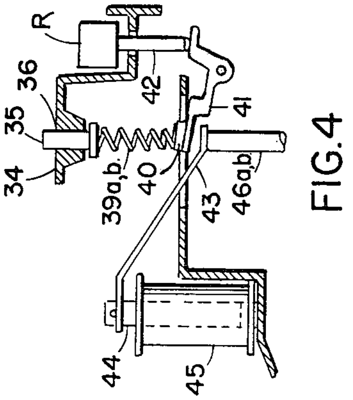
FIG. 4 is a side view of the electrical and mechanical means for depressing or releasing the telephone instrument's contact pins which the hand set customarily or normally depresses or releases.
Figures 5, 6, 7, 8:
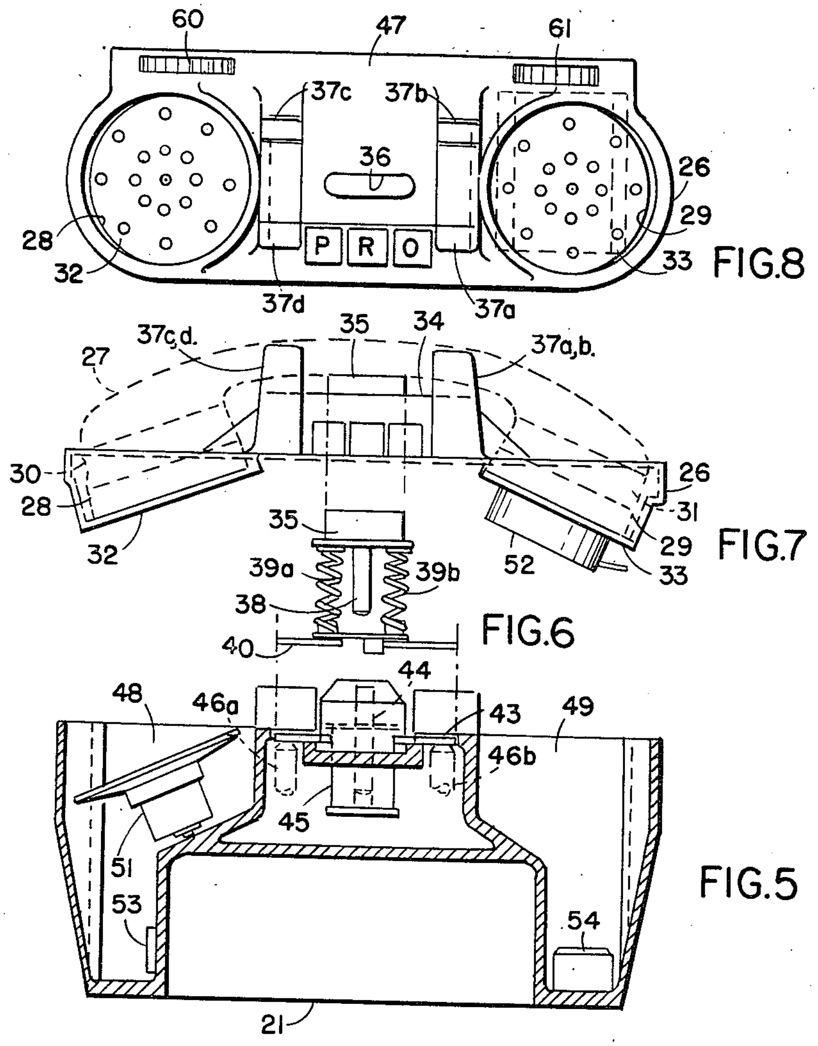
FIG. 5 is a front view section of the device, taken along the line 5—5 of FIGS. 1 and 2.
FIG. 6 is a detail view of the resilient intermediate extension between the telephone hand set and the telephone contact pins.
FIG. 7 is a front view of the cradle portion of the housing including the hand set support.
FIG. 8 is a plan view of the cradle shown in FIG. 7, and an enlargement of the corresponding portion of the device shown in FIG. 1.
Figure 10:
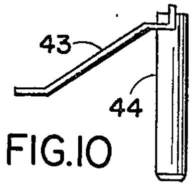
FIG. 10 is a side view of the core and plate shown in FIG. 9.
Figure 12:
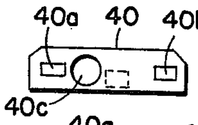
FIG. 12 is a top view of the plate shown in FIG. 11.
Figure 11:
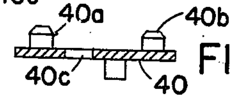
FIG. 11 is a front view showing the intermediate plate of the resilient extension of FIGS. 4 and 6.
Figure 9:
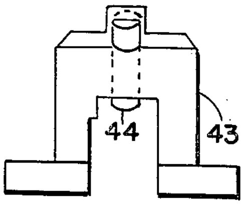
FIG. 9 is a front perspective view of the core and plate of the solenoid shown in FIG. 4.

In one of its general aspects, the device, according to the invention, is completely self-contained in a single housing 21, as shown in the drawings. This housing comprises basically two portions, a front portion which herein includes a cradle or support wherein the telephone receiver-transmitter hand set is supported, and the rear portion in which a relatively small tape recorder, preferably employing a continuous closed-loop tape, is located. The housing is such that it can be placed over a standard telephone instrument after the hand set is lifted from the telephone cradle. Cradle portion 47 fits directly over the cradle of the telephone instrument. The hand set is then replaced in the cradle of the device. Thereafter, nothing has to be added to or removed from the telephone instrument. The device is not electrically connected to the telephone instrument, as it derives its power from a regular alternating current (115 volt AC) power outlet. The front part of the housing bridges the cradle of the telephone instrument in such a manner that the telephone depressible means, such as the two spring-loaded contact pins 46*a* and 46*b*, which are normally depressed by the telephone hand set, protrude upwardly inside the center area of the device, as shown in broken lines in FIG. 5; thus, the telephone hand set cradle portion (FIGS. 7 and 8) is positioned (like a lid) over the telephone cradle. A speaker 51 (FIG. 5) is positioned in pocket 48 below the cradle 47 of the device. When the device is activated, speaker 51 emits a fixed pre-recorded outgoing message into the transmitting portion of the hand set of the telephone instrument. A microphone 52 (FIG. 7) may be attached to the perforated bottom 33 of cradle 47, or may be secured in the correspondingly arranged pocket 49. When the device is activated, microphone 52 receives the incoming message from the receiving portion of the telephone hand set. In the center of cradle portion 47 (FIG. 8) is an elongated slot 36 through which protrudes lug 35 of an intermediate contrivance which is a resilient extension, engageable with the hand set (FIG. 6). Lug 35 and its guide shaft 38 is normally depressed by the weight of the telephone hand set and is guided in opening 40*c* in plate 40. The springs 39*a* and 39*b* which support lug 35 are in turn supported by a suitable plate 40 having guides 40*a* and 40*b* therefor (FIGS. 6, 11 and 12). This plate rests freely on top of another plate or extension 43 (FIGS. 8 and 9) which holds down the upwardly protruding contact pins of the telephone instrument and which has in the center of its rear portion an armature core or plunger 44 (FIG. 9) of a solenoid 45 (visible in FIG. 5 and shown in FIG. 4). In the front portion of cradle 47 are three spring-loaded mechanically linked pushbuttons, R (record), P (playback) and O (off or stop). When any of the buttons are depressed, any other previously depressed button will automatically return to normal position. Plate 40, which supports the springs of lug 35, is connected to a bell-crank lever 41 (FIG. 4).

Figure 14:
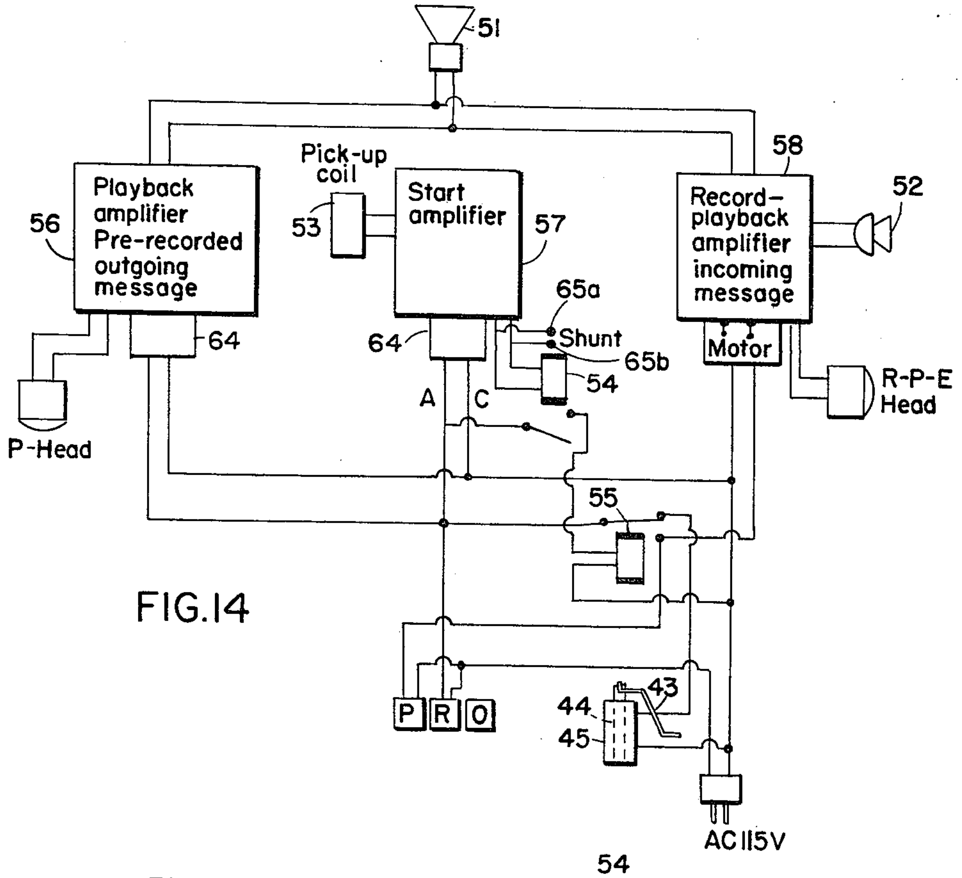
FIG. 14 is a schematic circuit diagram employable in the device.

The device operates generally in the following manner. The telephone hand set is removed from the telephone instrument and housing 21 is placed over the instrument. Cradle or support 47, connected to housing 21, is thus positioned over the cradle of the telephone instrument. The telephone hand set is placed in cradle 47, thus depressing the center lug 35, which in turn compresses the springs 39*a* and 39*b* which press plate 40 down on top of the solenoid-operated plate 43 which in turn holds down the contact pins 46*a* and 46*b* of the telephone instrument. When combined, all the above-mentioned parts shown in FIG. 6 become an extension device which is actually an extension of the telephone contact pins 46*a* and 46*b* upward to the telephone hand set. When the telephone is to be manually operated, the subscriber has only to pick up the telephone hand set from cradle portion 47 (FIG. 7) and dial as usual. When the telephone hand set is lifted the spring-loaded contact pins 46*a* and 46*b* of the telephone instrument are freed from any pressure of the extension device (FIG. 6) and are thus free to operate in a normal upward manner to allow the telephone to be manually operated. To set the device for automatic operation, button R is depressed, causing the bell-crank lever 41 (FIG. 4) to lift up plate 40 which in turn compresses springs 39*a* and 39*b* (FIG. 4) thus causing telephone contact pins 46*a* and 46*b* to be free from weight of the hand set. At the same time, pushbutton R, acting as a switch, feeds AC current to energize the solenoid which pulls plate 43 down to hold telephone contact pins 46*a* and 46*b* down (FIG. 4) as if the telephone hand set was holding the pins, while at the same time feeding current to the start amplifier and playback amplifier (outgoing message) (FIG. 14).

When the telephone bell rings, it emits an electromagnetic field which is picked up by a pick-up coil 53 (FIGS. 2, 3 and 5) which in turn is amplified by the start amplifier (FIG. 14), which in turn actuates relay 54 which in turn actuates relay 55 which in turn feeds current to the motor which moves the tape and at the same time turns the record amplifier on (incoming message) (FIG. 14), and simultaneously cuts the current to the solenoid. When the solenoid is de-energized, plate 43 is thereby free. Spring-loaded telephone contact pins 46*a* and 46*b* thus spring upward (as though someone had lifted the telephone hand set off the cradle). At the same instant, the tape, which has been set in motion, emits the pre-recorded outgoing message through speaker 51 into the transmitting portion 30 of the telephone hand set, which instructs the caller to give any message he desires. The caller's message is then received by microphone 52 from the receving portion 31 of the telephone hand set and is recorded by the tape recorder onto the magnetic tape at a pre-determined area on the tape. A metal foil strip, coating or other electrical conductive mark 69, positioned on the tape, engages pins 65*a* and 65*b*, thereby connecting 65*a* and 65*b* and thus shunting the circuit, re-energizing solenoid 45 which causes plate 43 (FIG. 4) to once again depress the telephone contact pins as if someone had replaced the telephone hand set, ending the call. Simultaneously, the motor which was driving the tape stops and the device is ready for the next call.

The caller's message can then be played back through speaker 51 by pushing button P (playback), (button R is automatically released). By pushing button O, button R or button P is automatically released and the device is shut off, thus restoring the telephone to its normal position, ready for manual operation.

Figure 3:
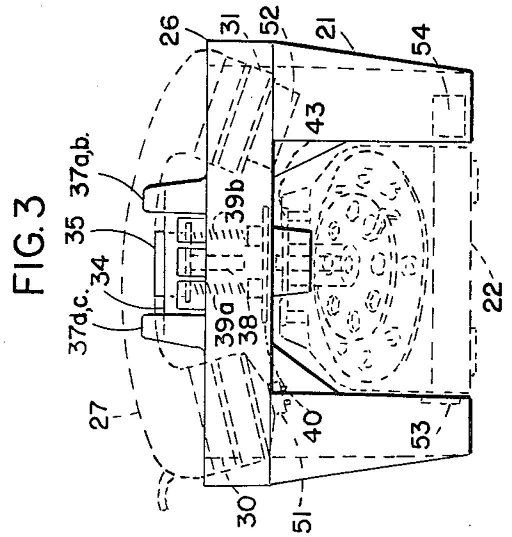
FIG. 3 is a front view of the device in FIG. 1.
Figure 1:
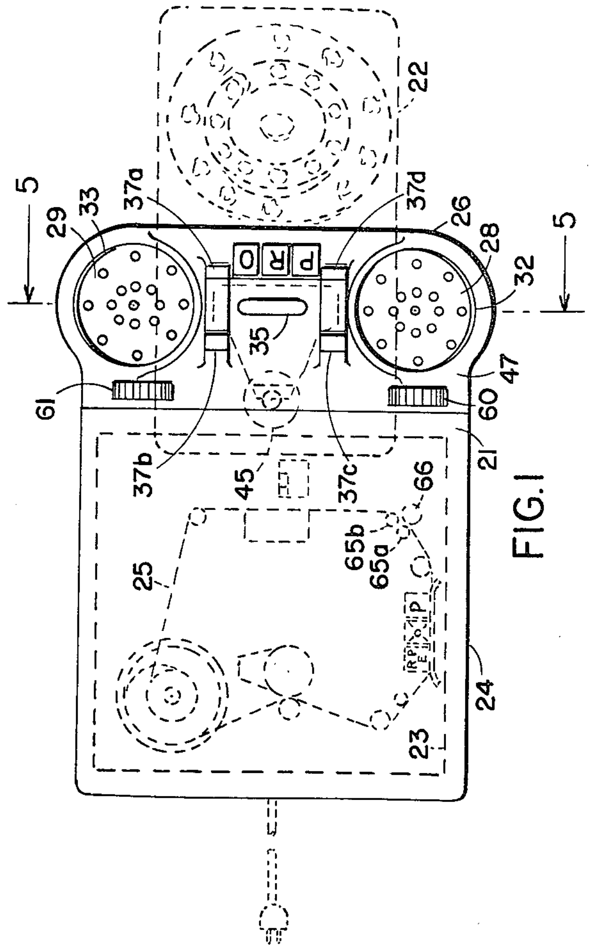
FIG. 1 is a plan view of a telephone call answering and message recording and playback device according to the invention, further illustrating the manner in which the housing of the device is positioned over a conventional telephone instrument, which is shown in broken lines.
Figure 2:
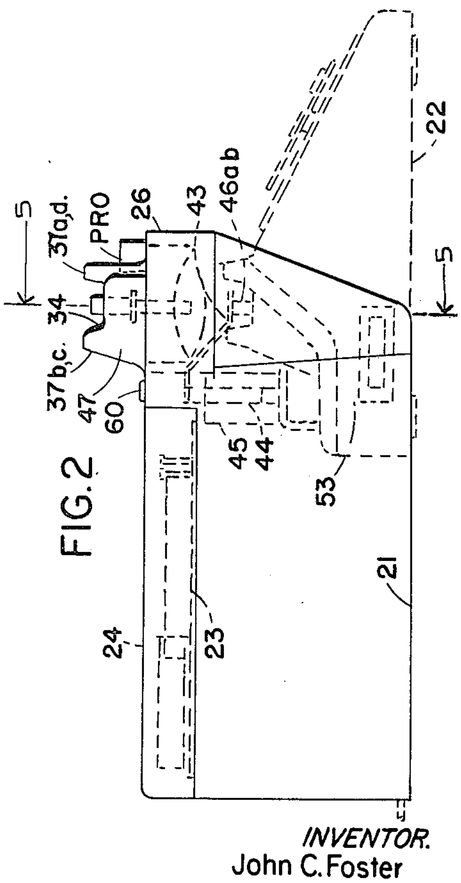
FIG. 2 is a side elevation of the device in FIG. 1.

Referring now in more detail to the drawings illustrating a preferred embodiment by which the invention may be realized, there is shown in FIGS. 1, 2 and 3, in three projections, a substantially box-shaped housing 21, the forward portion of which fits over a conventional telephone instrument 22. Disposed in the rear portion of housing 21 is the tape recorder and playback section 23, covered by a lid 24. This type of tape recorder is arranged for use with a closed-loop magnetic tape 25. Cradle portion 47 at the forward portion 26 of housing 21 serves as a rest or cradle for the hand set 27 of telephone instrument 22. There are two receptacles 28, 29 in portion 26 for receiving respectively the microphone or transmitter part 30 of telephone hand set 27 and the speaker or receiver part 31 thereof. Receptacles 28, 29 have perforated bottoms 32, 33. The center portion 34 of portion 26 is elevated and serves as the support for hand set 27. The lug 35 extends vertically through an elongated slot 36 in center portion 34. Four vertical posts 37*a*, 37*b*, 37*c* and 37*d* on the four corners of center portion 34 are arranged for holding hand set 27 in place. In front of center portion 34 are three pushbuttons P, R, O, hereinafter described. Lug 35 has a guide shaft 38, and is resiliently supported by two helical springs 39*a* and 39*b* which in turn rest on plate 40. The bell-crank lever 41 is pivotally located in front of plate 40 in such a manner that an extension pin 42 on push-button R abuts against one arm of lever 41, whereas the other arm thereof extends below plate 40. Thus, upon manually depressing button R, plate 40 is lifted against springs 39*a* and 39*b*. Another plate 43 is located underneath plate 40. Plate 43 is secured to the armature or core 44 of a solenoid 45 which is placed in housing 21 below portion 26. Plate 43 also rests on top of the hand set spring-loaded contact pins 46*a* and 46*b* of telephone instrument 22. The combined weight of core 44 and plate 43 is less than the upwardly directed force of the springs under contact pins 46*a* and 46*b*. Thus, when solenoid 45 is energized pulling in core 44, after button R is depressed and bell-crank lever 41 raises plate 40, plate 43 will push the pins down, as shown in FIG. 4. This creates the same condition of telephone instrument 22, as if hand set 27 is placed on the pins for readying the telephone for normally receiving incoming calls.

Speaker 51 is located in pocket 48 of housing 21 underneath bottom 32 of portion 26. The transmitter or microphone of telephone hand set 27 is located over bottom 32. Microphone 52 is attached to the underside of bottom 33 of portion 26 in the area where the speaker of hand set 27 will be located. Microphone 52 may alternatively be located in pocket 49 of housing 21 underneath bottom 33. Pick-up coil 53 is attached inside housing 21 opposite the area where the bell of telephone instrument 22 is located, and first relay 54 is placed in housing 21.

Volume control 60 for the playback of tape recorder 23 is arranged in portion 26 and a resettable counter 61 for counting the recorded incoming calls which, operated by a conventional ratchet-and-pawl device between the counter wheel and plate 43 (not shown in the drawing), is also arranged in portion 26.

Figure 13:
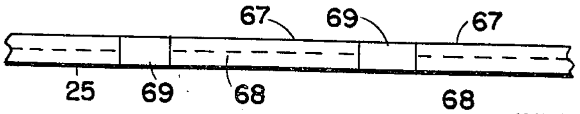
FIG. 13 is a portion of the magnetic recording tape.

Tape recorder 23 has basically two heads, marked P and R-P-E, and it also has two contact or shunt pins 65*a* and 65*b* over which magnetic tape 25 is guided under a positive pressure of roller 66. Tape 25 has upper and lower tracks, 67 and 68, respectively (FIG. 13), the former arranged for taking the incoming messages, the latter prepared over a certain length for carrying a prerecorded message which the device will deliver to the caller, advising him at the same time to speak his message which will be recorded on track 67. Tape 25 may be provided with further tracks. Metallic foil or coatings 69 are placed at certain intervals on the otherwise non-conductive tape 25 in order to terminate the recording by contacting pins 65*a*, 65*b*, shunting relay 54, which in turn de-energizes relay 55, which returns circuit to ready position for the next call.

Figure 15:
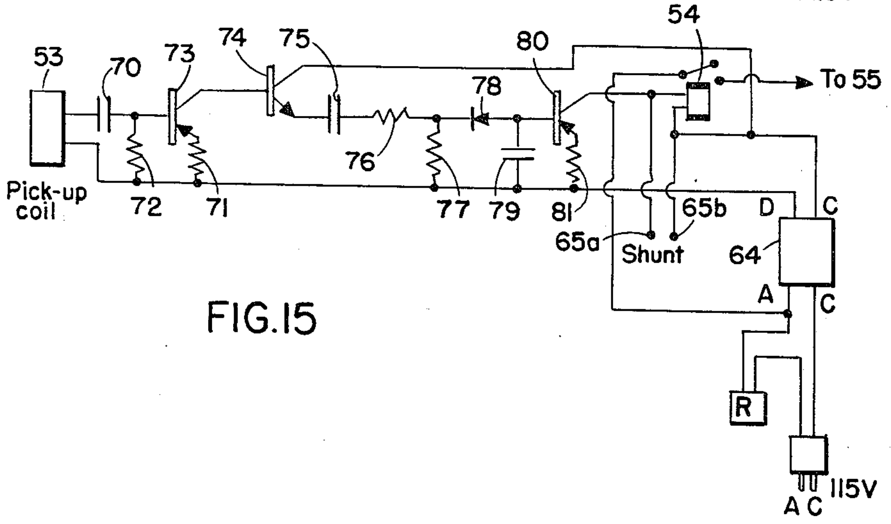
FIG. 15 is a detailed schematic circuit diagram of the "Start amplifier" in FIG. 14, employable in the device.

The electric circuit is simple and comprises relay 54, a second relay 55, playback amplifier 56, start amplifier 57 and record amplifier 58. Playback amplifier 56 transmits the prerecorded outgoing message, whereas the recorded incoming message is transmitted through amplifier 58 when it is played back later on. FIG. 14 shows the circuit diagram; FIG. 15 shows the details of start amplifier 57.

The operation of the device in more detail may be described as follows. Housing 21 is placed over telephone set 22, and the electric feed line of the device is plugged into the AC power outlet. Hand set 27 is placed over center portion 34 and rests on lug 35. It is supported there by springs 39*a* and 39*b* which rest on intermediate plate 40. This condition is seen in FIG. 3. When hand set 27 is lifted, the upwardly directed force of the springs under pins 46*a* and 46*b* of telephone set 22 lifts plate 43 and intermediate plate 40 so that telephone instrument 22 may be manually operated as usual.

However, when the device is readied to operate automatically, recording button R is depressed, causing intermediate plate 40 to be lifted off plate 43 by virtue of bell-crank lever 41 and simultaneously causing start amplifier 57, solenoid 45 and playback amplifier 56 to become energized. Energized solenoid 45 causes plate 43 to hold down telephone pins 46*a* and 46*b*. The device is now ready to receive calls.

When the telephone bell rings, pick-up coil 53 responds and an electric signal, which is amplified by start amplifier 57, causes relay 54 to close. This causes relay 55 to close. By this action, solenoid 45 is de-energized, telephone pins 46*a* and 46*b* are freed, and the motor of tape recorder 23 starts moving tape 25. The pre-recorded message is given to the caller through head P and the playback amplifier and over speaker 51, informing him the subscriber is out and inviting him to give his message which will be recorded.

The incoming message will be transmitted over amplifier 58 to head P-R-E and recorded on track 67 of tape 25 until electrical conductive mark 69 contacts pins 65*a* and 65*b*. This causes relay 54 to open whereby relay 55 is opened and solenoid 45 is reenergized, pulling down plate 43 which pushes down pins 46*a* and 46*b*. At the same time, tape recorder 23 is stopped. The device is ready for the next call. Counter 61 has been moved forward by one number by the movement of plate 43.

When the owner of the telephone instrument 22 returns, counter 61 shows the number of recorded telephone calls which came in, and by pushing button P, playback amplifier 58 is energized, tape recorder 23 starts running and the messages will be played back over the head P-R-E through speaker 51 until the device is shut off by pressing button O.

Various electrical components which are employed in the preferred circuit (FIG. 15) are identified as follows:

Starting from pick-up coil 53, the circuit comprises capacitor 70 of substantially 10 mf., resistor 72 of substantially 5.8K ohms, transistor 73, resistor 71 of substantially 100 ohms, transistor 74, capacitor 75 of substantially 5 mf., resistor 76 of substantially 2.2K ohms, resistor 77 of substantially 2.2K ohms, diode 78, capacitor 79 of substantially 10 mf., transistor 80, and resistor 81 of substantially 100 ohms.

The aforementioned electrical components are connected to the other components as shown in FIGS. 14 and 15. Numeral 64 designates, in FIGS. 14 and 15, step-down rectifiers to convert AC to a suitable DC voltage level adapted for the device embodying the invention. Step-down rectifiers 64 are of the type that do not employ transformers in order to avoid interference with pickup coil 53. The conventional battery eliminator can be adapted for this purpose.

Record-playback amplifier 58 is provided with a switch (not shown) in order to switch it from record to playback. It is understood that in lieu of one record-playback amplifier, two separate amplifiers may be used.

I claim:

1. An automatic telephone call answering and message recording device having tape recording and playback apparatus provided with playback amplifier and record playback amplifier for use in conjunction with a conventional telephone instrument and call signal means, said instrument being provided with a hand set having a transmitter portion and a receiver portion and a base provided with a cradle for said hand set and depressible spring-loaded means engageable by said hand set when positioned on said cradle; comprising a support arranged over said cradle when said hand set is removed therefrom, said support receiving said hand set, first actuating means engageable with said spring-loaded means, said actuating means exerting pressure on said spring-loaded means to depress the same when said actuating means is actuated and returning to initial position by upward pressure of said spring-loaded means when said actuating means is deactuated, means interposed between said actuating means and said support, said interposed means being contactable with said hand set, when said hand set is positioned on said support, and with said actuating means, second actuating means for compressing said interposed means in a direction away from said first actuating means and for connecting in electric circuit means for actuating said first actuating means whereby said first actuating means depresses said spring-loaded means, said interposed means and said first actuating means cooperating to depress said spring-loaded means when said hand set is in position on said support and to permit said spring-loaded means to raise when said hand set is removed from said support for normal operation of said telephone instrument when said first actuating means is not actuated, means responsive to a signal from said call signal means for de-actuating said first actuating means whereby said spring-loaded means returns to said initial position and for enegrizing means, readied by said second actuating means, for delivering a pre-recorded outgoing message, means for recording an incoming message, and means for readying the device for the next incoming call.

2. A device according to claim 1, comprising further electrical circuitry in said apparatus being connected to said circuitry, start amplifier means, means for simultaneously actuating said first actuating means thereby depressing said spring-loaded means and energizing said start amplifier and said playback amplifier, first relay means, second relay means, a pick-up coil responsive to said call signal means, the current in said coil being amplified by said start amplifier, said amplified current actuating said first relay means thereby actuating said second relay means thereby simultaneously feeding current to said apparatus, to said record-playback amplifier, to said playback amplifier, thus actuating said playback amplifier to deliver a pre-recorded message to said transmitting portion of said hand set, and de-actuating said first actuating means freeing said first actuating means from contact with said spring-loaded means, permitting the caller's incoming message to be transmitted through said record-playback amplifier and recorded on said tape, means for stopping said apparatus, de-energizing said first and second relays, and re-actuating said first actuating means causing it to again depress said spring-loaded means, readying said device for the next call, means for playing back said incoming message through said apparatus, and means for restoring said first actuating means to normal position whereby said first actuating means is free to be raised by said spring-loaded means when said hand set is removed from said support.

3. A device according to claim 2, and counter means engageable with said first actuating means whereby said counter means registers each de-actuation of said first actuating means thereby counting the number of incoming messages.

4. A device according to claim 2, said circuitry including an alternating current power source and transistorized direct current circiuts for said amplifiers and means for switching the alternating current.

5. An automatic telephone call answering and message recording device with recording and playback apparatus for use in conjunction with a conventional telephone instrument and call signal means, said instrument being provided with a transmitter-receiver hand set and a base provided with a cradle for said hand set and sensing means actuated by said hand set when positioned on said cradle; comprising: a support arranged over said cradle and adapted to receive said hand set, said sensing means being free from actuation by said hand set when said hand set is on said support; electromagnetic means controlling the state of said sensing means, said sensing means having a first state indicative of the condition when said hand set is on said cradle and a second state indicative of the condition when said hand set is off said cradle; electric circuit means for operating said electromagnetic means, said electromagnetic means controlling said sensing in both of said states with said hand set stationary on said support; means for delivering a pre-recorded outgoing message; means for recording an incoming message; and means responsive to a signal from said call signal means for switching said electric circuit means to operate said electromagnetic means whereby said sensing means is transferred to said second state from said first state by said electromagnetic means with said hand set remaining in fixed position.

6. An automatic telephone call answering and message recording device according to claim 5 wherein said sensing means comprises mechanical switching means engageable by said hand set in said conventional telephone instrument so that said switching means is in said first state when said hand set is on said cradle and is in said second state when said hand set is off said cradle and disengaged from said switching means.

7. An automatic telephone call answering and message recording device according to claim 5 wherein said electromagnetic means is energized when said sensing means is in said first state, said electromagnetic means being de-energized when said sensing means is in said second state.

References Cited

UNITED STATES PATENTS

| | | | |
|---|---|---|---|
| 3,248,482 | 4/1966 | Kamborian | 179—6 |
| 3,296,382 | 1/1967 | Klumb et al. | 179—6 X |
| 3,299,209 | 1/1967 | Roger | 179—6 X |
| 3,319,003 | 5/1967 | Prager | 179—1 |

OTHER REFERENCES

Spratt: Simple Telephone Answering Machine, 1956, Wireless World, P. 345.

BERNARD KONICK, Primary Examiner

R. F. CARDILLO, Jr., Assistant Examiner

U.S. Cl. X.R.

179—1